United States Patent [19]

Witt

[11] Patent Number: 4,568,564

[45] Date of Patent: Feb. 4, 1986

[54] IMPREGNATED WOOD PRODUCT HAVING A BLEACHED OR WHITE APPEARANCE AND PROCESS FOR MAKING THE SAME

[75] Inventor: Alvin E. Witt, Media, Pa.

[73] Assignee: PermaGrain Products, Inc., Media, Pa.

[21] Appl. No.: 587,488

[22] Filed: Mar. 8, 1984

Related U.S. Application Data

[63] Continuation of Ser. No. 510,895, Jul. 5, 1983, abandoned.

[51] Int. Cl.[4] ............................................. B05D 3/06
[52] U.S. Cl. .................................................... 427/44
[58] Field of Search ........................................ 427/44

[56] References Cited

U.S. PATENT DOCUMENTS

| | | | |
|---|---|---|---|
| 3,420,761 | 1/1969 | Feibush | 427/44 |
| 3,607,355 | 9/1971 | Loeb | 427/44 |
| 3,721,579 | 3/1973 | Barrett | 427/44 |
| 3,808,030 | 4/1974 | Bell | 427/36 |
| 3,808,032 | 4/1974 | Bosco | 427/36 |
| 3,933,875 | 1/1976 | Brose et al. | 427/44 |
| 4,194,955 | 3/1980 | Nowak et al. | 427/44 |

*Primary Examiner*—John H. Newsome
*Attorney, Agent, or Firm*—Eugene E. Renz, Jr.

[57] ABSTRACT

A wear-resistant wood product such as a wood flooring material having a white or bleached appearance which is obtained by impregnating wood with a solution of a polymeric resin whitening agent in a polymerizable monomer such as methylmethacrylate and, after uniform distribution of the monomer solution throughout the wood is obtained, the monomer is polymerized and the whitening agent precipitated in situ in the polymer matrix as a material having a refractive index sufficiently different from the refractive index of said matrix to impart a bleached or white appearance to said product.

16 Claims, No Drawings

IMPREGNATED WOOD PRODUCT HAVING A BLEACHED OR WHITE APPEARANCE AND PROCESS FOR MAKING THE SAME

BACKGROUND OF THE INVENTION

This application is a continuation of application Ser. No. 510,895 filed July 5, 1983 entitled IMPREGNATED WOOD PRODUCT AND PROCESS, now abandoned.

Impregnated wood products are known and have been used for many years in various applications including flooring. In recent years, particularly in view of rising energy costs, store owners and others choosing wood floors have found that a light-colored floor, preferably white, will decrease the amount of lighting required and thus, substantially decrease overall lighting costs. Such floors are thus highly desirable, but they must be able to resist discoloration due to wear and other physical abuse.

Wood floors can be chemically bleached on-site to achieve a white color. In present practice, a bleached, white floor is prepared on-site and covered with a standard polyurethane, oil, or other resin finish. However, with this type of floor finish, when damage to the floor occurs due either to wear or physical damage, the floor cannot be repaired without a splotched or otherwise uneven appearance. The present invention overcomes these deficiencies by providing a novel method for obtaining a bleached or white-appearing wood surface useful for flooring and other applications where a white colored wood is desired, e.g. furniture, cabinets, tables, and the like.

PRIOR ART

A process for imparting long lasting gloss, color depth properties, and stain resistance to wood tiles for floor and wall covering use is described in U.S. Pat. No. 3,808,032 to Bosco, issued Apr. 30, 1974. This process comprises impregnating the wood with a monomer polymerizable by organic-free radicals, polymerizing the monomer in situ in the wood, and thereafter coating the surface of the wood with a penetrating solution comprising a drying oil or a semi-drying oil. The polymerization is accomplished by exposure to ionizing radiation, and is catalyzed by including from about 0.01 to about 0.5 weight percent of a free radical polymerization agent in the monomer. The reaction is accelerated by heat. Suitable monomers include methyl methacrylate, vinyl chloride, vinyl acetate, styrene and mixtures of these monomers. Suitable drying oils include soybean, linseed, tall, tung, perilla, oitica, cottonseed, corn, sunflower and dehydrated castor oil and mixtures of these oils. The preferred drying oil is doubly boiled linseed oil. The oils are applied in amounts of about 0.05 to about 2.0 gallons per 6000 square feet of wood surface. The penetrating solutions comprise the oil in an organic hydrocarbon solvent in an oil to solvent ratio from about 3:1 to 1:3. The preferred solvents are naphtha, Stoddard solvent and petroleum ether. From about 0.01 to about 1 weight percent of a siccative agent such as cobalt, lead, zinc and manganese salts may be added to the penetrating solution. In this way, wood tiles are said to be obtained which have a permanent gloss, water spotting resistance and stain resistance.

A similar process for making wood-plastic composite tiles is described in Bell, U.S. Pat. No. 3,808,030, also issued on Apr. 30, 1974. In this process a halo-organophosphorous composition is included in the monomer before polymerization to impart flame retardancy and to prevent laking of the impregnant on the surface of the tiles. It is also alleged that the penetration of the polymerized plastic is so deep into the wood that the tiles may be sanded deeply before finishing by buffing without damaging the impregnated plastic. The patent also describes preferred finishing techniques to produce wood floor tiles having good wear and stain resistance.

Barrett, U.S. Pat. No. 3,721,579 issued Mar. 20, 1973 describes methods and apparatus for impregnating wood or concrete with a monomer and polymerizing the monomer in situ by irradiation. This patent teaches how to control the temperature and degree of polymerization in order to polymerize the monomer in the substrate without polymerizing the monomer bath surrounding the substrate and how to avoid vaporizing the moisture in the wood. This disclosure also lists a large number of suitable monomers for impregnation of the substrates.

In view of the foregoing, it is apparent that the art has attempted to solve the problem of staining and disclorations of floor tiles used in high traffic areas. However, the art has not previously solved the problem of providing and maintaining a wooden floor of white coloration in an attractive, long lasting condition, and attempts to make a wood product having a bleached or whitened appearance which would have satisfactory wear performance have, heretofore, been unsuccessful. Bleaching techniques, as discussed above are available to bleach the cell wall structure and make them appear white, but the plastic in the wood would still be yellow, even if it were possible to bleach the cell walls. Moreover, bleaching is disadvantageous because it necessarily breaks down the wood cells to some extent and tends to soften the wood thus reducing its wear resistance and increasing its tendency to stain.

Other conventional techniques for making something appear white or black are basically the same. The desired appearance is obtained by the incorporation of a pigment or a blinding agent. For a white coloration, it is usually a titanium or alumina-type of product that is used. These materials are white solids and thus color the carrying medium white. In the case of wood acrylics, the blinding material must be suspended in the methylmethacrylate (MMA) and forced into the pores of the wood. However, the pores of wood, by nature, tend to act like a filter, and thus selectively remove the suspended solids from the carrying solution. All of the new materials made by techniques for making finer and finer oxides, fumes, and smokes have been tried experimentally and have been found unsuccessful. Even the finest of the smokes, once suspended in the MMA, tend to be concentrated in pockets throughout the wood structure, and thus, a poor appearance is achieved.

It is an object of the present invention, therefore, not only to provide a white colored product, but also to enable such a product to retain its white appearance after continued wear or even after physical abuse. Still another object of the invention is to provide a process for making such a wood product, particularly hard wood products, useful for flooring and the like. Further, the product obtained by the process of the invention is economically produced and is thus made available to the public at reasonable cost.

BRIEF STATEMENT OF THE INVENTION

This invention provides a wear-resistant wood product having a white appearance by impregnating the wood with a solution of a polymeric resin whitening agent soluble in a polymerizable monomer, preferably an acrylate such as methylmethacrylate, and which after uniform distribution of the monomer-whitening agent solution throughout the wood is obtained, polymerizing the monomer, to produce a polymer in which the whitening agent is insoluble and in which the difference in the indices of refraction of the matrix polymer and whitening agent are sufficiently different that the composite material appears white. Any suitable polymeric resin whitening agent may be employed which is soluble in the matrix monomer and insoluble in the matrix polymer preponderantly derived therefrom and which has an index of refraction sufficiently different from that of the polymerized matrix that the final composite appears white. Suitable whitening agents include, without limitation, polystyrene, styrene butadiene rubbers and polycarbonates.

The white appearance of the wood product of the invention is unexpected since both styrene, styrene butadiene and carbonate monomers, and the acrylate matrix resins normally polymerize to clear resins. However, it is believed that in view of the diffraction of light or difference in refractive index caused by the small sized particles of whitening agent, such as polystyrene, which are precipitated from the monomer solution as it polymerizes, the white colored appearance is obtained. Further, since the particulate polystyrene or other whitening agent is distributed uniformly throughout the thickness of the wood, any wear on the wood surface or any gouging, chipping or other removal of a piece of the wood will not significantly affect its appearance.

DETAILED DESCRIPTION OF THE INVENTION

As indicated above, the invention resides in the impregnation of wood with a solution of a polymeric resin whitening agent in a polymerizable monomer, and after uniform distribution of the solution throughout the wood is obtained, effecting polymerization of the monomer. In this way, a distribution of fine whitening agent particulates is achieved within the polymerized monomer in the wood.

Any wood may be treated by the process of the invention and suitable wood for flooring or decorative applications includes, among others, red oak, white oak, ash, spruce, yellow poplar, sugar maple, white pine, birch, mahogany, and locust. The organic monomer used in the invention will be any of those monomers subject to polymerization by conventional techniques, such as thermal, or free radical polymerization or the like, such as the acrylates, vinyl halides (e.g. vinyl chloride and vinyl acetate and their mixtures), styrenes and the like. While these monomers are operable, they are not preferred due to their noxious handling and environmental properties and consequent government restrictions and the costs entailed thereby. Preferably, an acrylate will be used and, most preferably, methyl methacrylate will be used as a solvent for the whitening agent. The amount of whitening agent used in the monomer solvent will be sufficient to produce the desired degree of whiteness to the wood and this can easily be determined by simple experiment. In general, however, the amount of whitening agent in the monomer will be at or near the solubility limit of the whitening agent in the monomer. Another limit is the viscosity; if too high-impregnation will be difficult or impossible to depth or full penetration. Such a saturated solution may be prepared by adding polystyrene or other whitening agent to the monomer until no more dissolves or the material becomes too viscous, filtering off the undissolved resin and using the filtrate for the wood impregnation process. Polymerization of the matrix monomers may be effected by any of the known techniques, e.g. radiation with cobalt 60, thermally, and the like. The preferred polymerization technique will be the use of cobalt 60.

It will be understood that additives to the impregnation system may be used to reduce the heat of polymerization, radiation requirements and/or the cost of the impregnant. Certain plasticizers can be expected to provide one or all of the foregoing advantages: for instance sebacates, adipates, polychlorinated phenyls or phthalates. Dyes may be added to the impregnating solution, if desired, in order to achieve pleasing color shades. Usually no more dye than about 2.0% by weight of impregnating solution will be used. Another optional ingredient of the impregnating solution will be a cross-linking catalyst such as the conventional polymerization initiators known in the art. By using such initiators, usually in an amount of up to about 5% of the impregnating solution, the degree of radiation and/or the thermal effects of polymerization may be reduced.

The impregnation with the selected monomer solution of polystyrene or other whitening agent is carried out in a impregnation/irradiation vessel, known in the art, of suitable dimensions such as a vessel of about 1 ft × 2 ft × 8 ft. After introducing the wood articles to be impregnated to the vessel, it is placed in a 3′ diameter vessel for impregnation. The vessel is then evacuated once or twice, suitably to about 20–30 millimeters mercury pressure each time for a suitable period, e.g., about 2 hours. The impregnant is then introduced through suitable valving to completely immerse the articles. The head space is then filled with an inert gas such as nitrogen under pressure, suitably about 80 to about 150 psi for a suitable period of time, e.g. about 3 hours. The pressured gas should be free of oxygen since oxygen inhibits the radiation polymerization reaction. The period required for suitable impregnation will, of course vary with the wooden material depending upon its porosity, the viscosity of the monomer and other factors and may be determined for each material by trial and error. Generally speaking, an impregnation period of about 2 to about 3 hours is generally adequate. This time and other conditions may be varied to control the depth of impregnation as desired. Th viscosity of the monomer must be such that it will penetrate the pores of the particular wood to be impregnated. Multiple impregnations up to about seven may be used to assure thorough penetration of the wood. In general, the loaidng of the impregnant in the wood will be from about 0.2 to about 1.5 pounds of impregnant per pound of wood. Each impregnation will generally be conducted on from about 200 square feet (wood plank) to about 450 square feet (oak or ash) of wood material.

The pressure is then reduced and the excess monomer solution is drained from the vessel. The vessel containing the impregnated articles is then placed in a cobalt 60 irradiator. The pool irradiator arrangement may suitably be a tank about 26 feet deep or more, about 50 feet long and about 22 feet wide filled with water. A standard irradiator unit such as a "NEPI" unit or an "NPI"

unit may suitably be placed on the floor of the pool irradiator. Such irradiator source units available from NUMEC contain 500,000 curies of cobalt 60 and comprise 37 inch pencils arranged in a plaque 12 feet by 9 feet. Any other source unit providing equivalent gamma radiation may be employed. Such an irradiator arrangement operates at ambient temperature and pressure. Handling means are also provided for lowering the canister to the proper pool depth and orienting within the zone of irradiation.

The canister is first preferably flushed several times to purge it of oxygen. This is suitably accomplished by the use of nitrogen at about 5 psi. The cover of the canister is then sealed and the canister is lowered into the water in the pool and passed slowly through the irradiation zone close to the source of irradiation. Irradiation is carred out for a predetermined period of time, for example, about 10 hours and provides a dose of about 1.7 MRAD. The period of treatment and dosage will, of course, vary with the monomer and substrate being impregnated, but, in general, the irradiation will be continued for about two hours after the exotherm occurs.

Generally speaking, the dosage required to convert a monomer to a polymer varies with the square root of the radiation dose rate. The dosage requirement for complete polymerization of the monomer in the wood articles is determined by such factors as the type of wood used, the type and concentration of the monomer, the presence of impurities, such as oxygen for example, in the impregnant or in the wood or environment and the use of irradiation activators.

The radiation-induced polymerization causes the monomer molecules to become linked throughout the wood article forming a network of polymer that envelops the pores of the components thus sealing them in plastic. At the same time the polystyrene or other whitening agent is precipitated throughout the polymerized monomer and act as a white pigment or dye which, due to diffraction of light, takes on the appearance of a white coloration throughout the wood. Radiation-induced polymerization as described above, proceeds by a free radical process, and does not require the addition of either heat or catalyst, although both may be used if desired. However, inasmuch as the radiation itself acts as a catalyst, it offers a method of controlling the exothermic polymerization reaction in the substrate, which is difficult to achieve if catalyst and heat are employed.

THE WHITENING AGENTS

As noted above the whitening agent may be any suitable polymeric resin which is soluble in the matrix monomer, isoluble in the matrix polymer, and which has an index of refraction which differs from that of the matrix polymer sufficiently to provide a white appearance for the composite article.

It has been found that any commercially available polystyrene is suitable since they are all soluble in the matrix monomers recited above such as methyl methacrylate (MMAS) for example, and yet are insoluble in the matrix polymer, polymethylmethacrylate for example. Polystyrene has been found to produce excellent whitening of an impregnated wood product. Polystyrene is completely miscible in MMA. Increasing concentrations result in increased opacity, but above about 5% the result is not detectable by the naked eye. Since most whitening agents cost more than MMA, it is not cost effective to add more than necessary. Increased concentrations also increase the viscosity which increases the pressure required for complete impregnation. Polystyrene is soluble in other matrix monomers at similar levels to achieve suitable whitening of wood impregnated with such monomers prior to their polymerization. While any commercially available polystyrene may be used, the white powder polystyrene available under the trademark DYLENE from Arco Chemical is suitable; especially grade 8E.

Other suitable whitening agents are the commercially available styrene-butadiene rubbers which are soluble in the matrix monomers but insoluble in the matrix polymers, to provide good whitening effect in the composite wood articles due to the difference between their indices of refraction and those of the matrix polymers. These styrene-butadiene rubbers are generally soluble in MMA and other suitable monomers with the limits established by economics and the viscosity limitations of the equipment. Suitable materials of this type are available from several companies. The ratio of styrene to butadiene in these polymers may vary from about 1 to about 3.

Still other suitable whitening agents include the polycarbonates.

As noted above, it is believed that the whitening ability of the various suitable polymeric whitening agents is due to the difference between their refractive index and that of the matrix polymer. Indeed it is most surprising in some cases that such a whitening effect occurs, since some of the whitening agents and matrix polymers are colorless per se.

While the whitening agents named herein are presently the only known polymers that have the desired effect among a wide variety that have been tested which do not have a useful degree of whitening effect, it will be obvious to those skilled in the art that other polymers, although less effective, may be useful in some applications, and that still other polymers which have not been tested, may be equal to or even superior to those recited above. All such polymers are, therefore, considered to be included herein as equivalents.

While as noted above, mixtures of the operable monomers may be employed, it is by far preferable, for economic reasons, to employ the readily available and inexpensive monomer, methylmethacrylate (MMA). Of course, economics can change with advancing technology and market conditions, but at present, it is preferred to employ MMA alone. For these reasons, the presently preferred practice is not to employ mixtures of polymerizable monomers, even though operable, for purposes of economy. Therefore, the polymer matrix is normally preferably preponderantly a homopolymer of MMA or whatever other monomer is used. That is not to say that, mixtures of monomers leading to copolymers of the solvent monomer are excluded, or even that copolymers of the monomer or mixture of monomers and the polymer are excluded. However, the invention does contemplate that the polymer be predominantly saturated and unreactive with the monomer and that the monomer or mixture thereof produces a polymer matrix which is predominantly a homopolymer of the predominant monomer. It is, of course, permissable to incorporate small or even substantial amounts of a second polymerizable monomer, although it is preferred for reasons of economy to employ the preferred inexpensive methyl methacrylate as the sole monomer.

EXAMPLES

Example 1

An impregnating solution is prepared to contain a polystyrene resin (about 5% by weight) in methylmethacrylate. The brookfield viscosity at this point is about 7.5 cp. Oak flooring material (450 sq. ft.) is introduced into a conventional impregnating vessel and the chamber evacuated to 27 inches of mercury and held at that vacuum for about 2 hours. The impregnating solution is then introduced into the chamber in an amount sufficient to cover the wood material and then nitrogen is introduced to a pressure of 125 psi. After about 2 hours, the pressure is released and the excess impregnating solution is drained from the vessel. Irradiation with cobalt 60 is then effected on the impregnated wood and continued for about two hours after the expected exotherm is noted. Upon removal of the treated wood from the treatment chamber, the wood is trimmed, assembled to the desired pattern for use, sanded and buffed. The finished wood material has a white bleached-like appearance and is found to be very durable to wear. Also, it is noted that upon cutting the treated wood, the exposed new surface has the same white uniform appearance of the uncut surface, thus requiring no repair.

Example 2

An impregnation and polymerization similar to that of Example 1, but carried out on pieces of ash, will provide similar results producing a durable ash wood product of uniform bleached appearance throughout the wood.

Example 3

Maple wood impregnated may also be polymerized as in Example 1 to produce a wood product having a uniform bleached appearance throughout the wood.

Example 4

The procedure of Example 1 may also be employed substituting styrene-butadiene rubber, such as those available from B. F. Goodrich, to obtain similar results.

Example 5

The procedure of Example 1 may also be employed substituting a polycarbonate, such as those available from General Electric, to obtain similar results.

I claim:

1. A wood product having a bleached or white appearance obtained by impregnating wood with a solution of a polymeric resin whitening agent in a polymerizable monomer and, after uniform distribution of the monomer solution within said wood is obtained, polymerizing the monomer to form a preponderantly homopolymer matrix.

2. The wood product of claim 1 wherein the monomer solution is essentially saturated with said whitening agent.

3. The wood product of claim 1 wherein the monomer is methyl methacrylate.

4. The wood product of claim 1 wherein the whitening agent is insoluble in the matrix polymer and has an index of refraction sufficiently different from that of the matrix polymer to impart a bleached or white appearance to said wood product.

5. The wood product of claims 1, 2, 3 or 4 wherein the whitening agent is selected from the group consisting of polystyrene, polystyrene butadiene rubber and polycarbonate.

6. The wood product of claims 1, 2, 3, or 4 wherein the monomer is methyl methacrylate and the whitening agent is polystyrene.

7. The wood product of claims 1, 2, 3, or 4, wherein the whitening agent is polystyrene butadiene rubber.

8. The wood product of claims 1, 2, 3, or 4, wherein the whitening agent is polycarbonate.

9. A process for making a wood product having a bleached or white appearance which comprises impregnating wood with a solution of a polymeric resin whitening agent in a polymerizable monomer, and after uniform distribution of the monomer solution in said wood, polymerizing said monomer and precipitating said whitening agent in the resulting preponderantly homopolymer matrix.

10. The process of claim 9 wherein the monomer solution is essentially saturated with said whitening agent.

11. The process of claim 9 wherein the monomer is methyl methacrylate.

12. The process of claim 9 wherein the whitening agent is insoluble in the matrix polymer and has an index of refraction sufficiently different from that of the matrix polymer to impart a bleached white appearance to said wood.

13. The process of claim 9 wherein the whitening agent is selected from the group consisting of polystyrene, polystyrene butadiene rubber and polycarbonate.

14. The process of claim 9 wherein the monomer is methyl methacrylate and the whitening agent is polystyrene.

15. The process of claim 9 wherein the monomer is methyl methacrylate and the whitening agent is polystyrene butadiene rubber.

16. The process of claim 9 wherein the monomer is methyl methacrylate and the whitening agent is polycarbonate.

* * * * *